Figure 1:
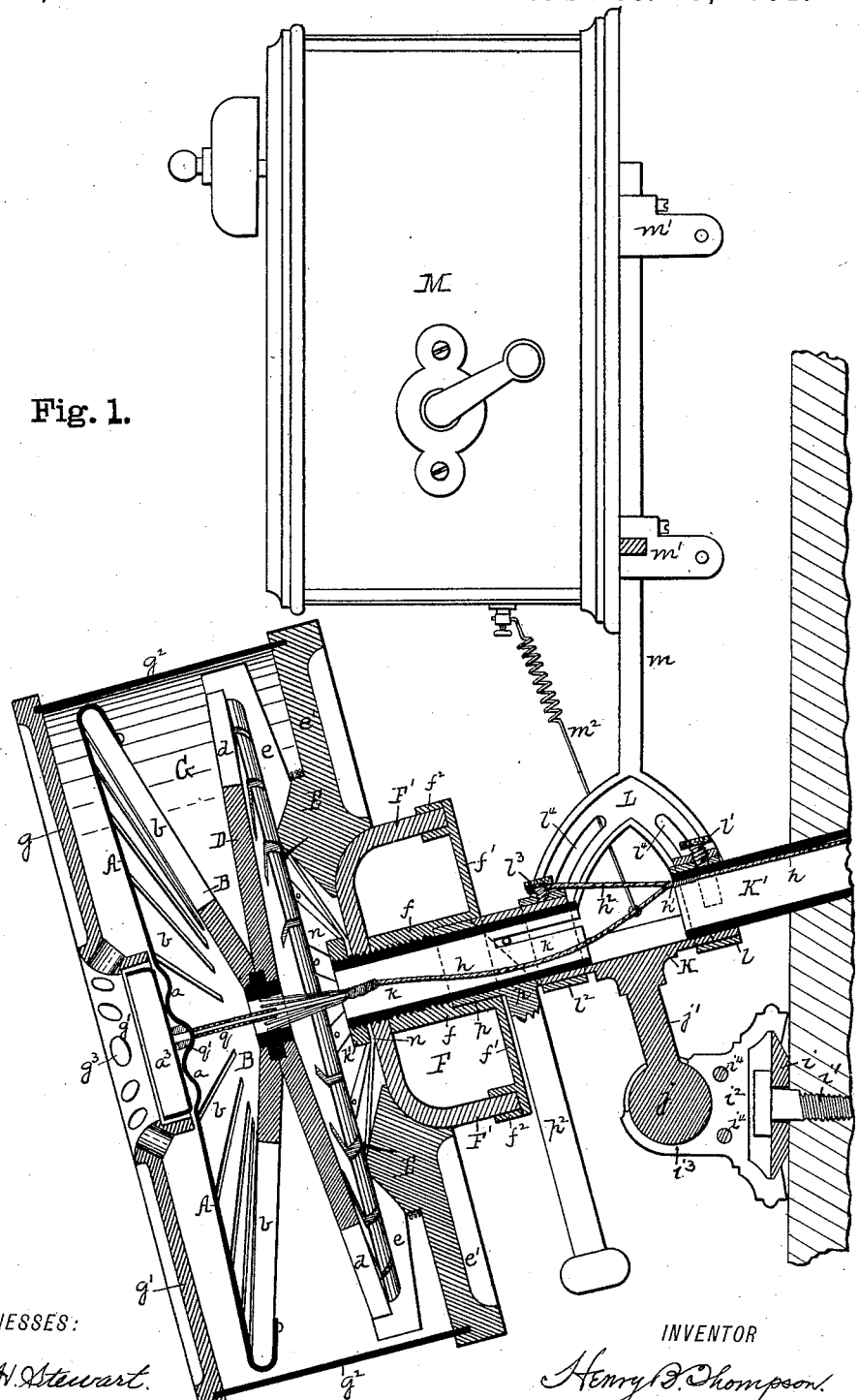

(No Model.)     3 Sheets—Sheet 2.

H. B. THOMPSON.
MECHANICAL TELEPHONE.

No. 466,086.     Patented Dec. 29, 1891.

WITNESSES:
David H. Stewart.
A. P. Casselberry.

INVENTOR
Henry B. Thompson.

(No Model.) 3 Sheets—Sheet 3.
H. B. THOMPSON.
MECHANICAL TELEPHONE.
No. 466,086. Patented Dec. 29, 1891.
Fig. 6. Fig. 4. Fig. 5.
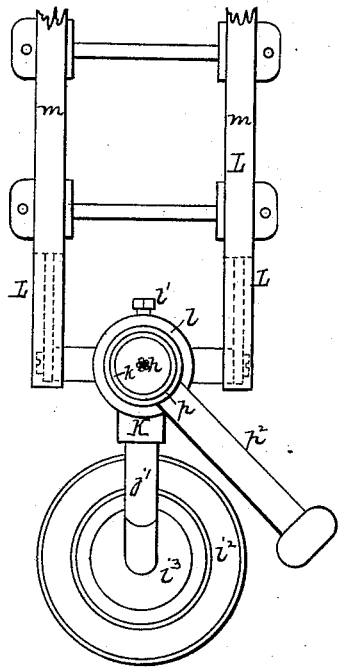
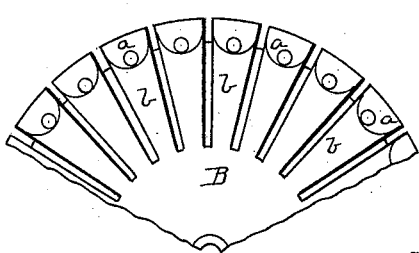
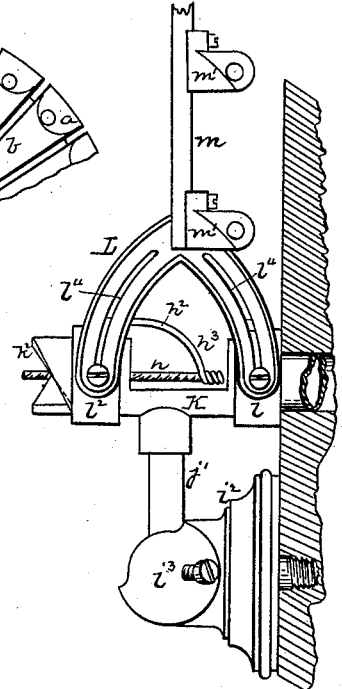
Fig. 3.
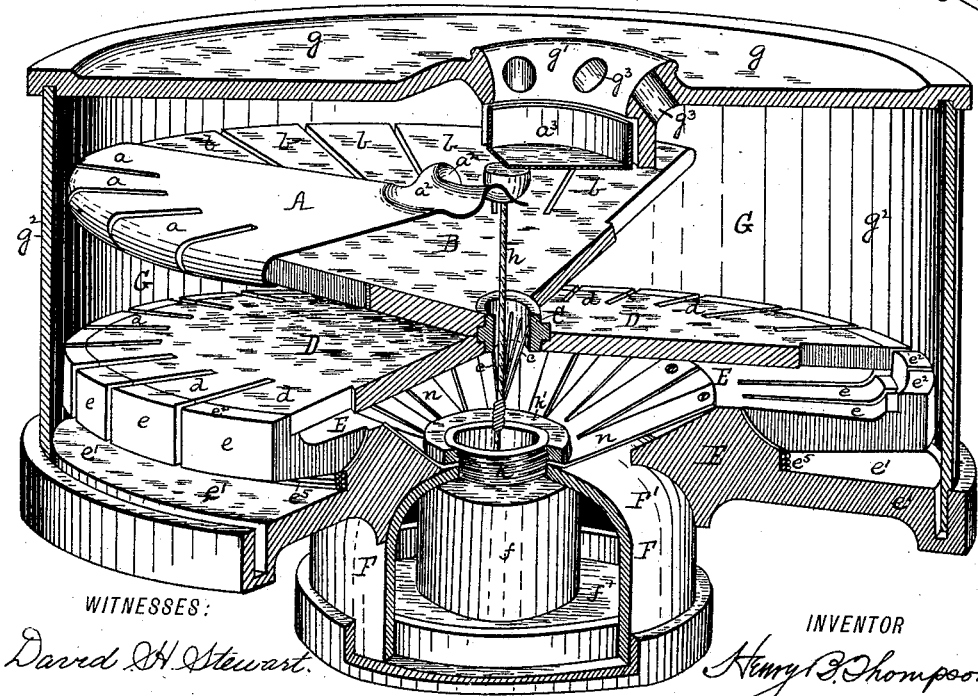
WITNESSES:
David H. Stewart.
A. Q. Casselberry
INVENTOR
Henry B. Thompson.
THE NORRIS PETERS CO., PHOTO-LITHO., WASHINGTON, D. C.

UNITED STATES PATENT OFFICE.

HENRY B. THOMPSON, OF PITTSBURG, PENNSYLVANIA.

MECHANICAL TELEPHONE.

SPECIFICATION forming part of Letters Patent No. 466,086, dated December 29, 1891.

Application filed June 13, 1891. Serial No. 396,121. (No model.)

*To all whom it may concern:*

Be it known that I, HENRY B. THOMPSON, a resident of Pittsburg, in the county of Allegheny and State of Pennsylvania, have invented a new and useful Improvement in Mechanical Telephones; and I do hereby declare the following to be a full, clear, and exact description thereof.

My invention relates to acoustic, or, as they are sometimes termed, "mechanical" telephones and to the support of the wires connecting the same.

In the mechanical telephones as heretofore generally constructed difficulty has been experienced from humming noises or metallic echoes and like interfering sounds, which prevented both the proper transmission of the vibrations or sound-waves striking the diaphragm or the reproduction of the sound-waves created by the diaphragm at the receiving end of the line. These interfering noises arise to a great extent from the collision of the sound-waves upon the diaphragm, resulting from the fact that the diaphragm is clamped, secured, or otherwise fixed around its periphery, and consequently where the sound-wave passes over the same to the periphery thereof and finds no escape on account of the rigid holding of the periphery it returns back along the diaphragm and collides with other sound-waves, so creating the interfering noises or echoes and interfering with the proper transmission or reproduction of articulate or other sounds.

The principal object of my invention is to provide a telephone in which this difficulty is overcome by the carrying away of the sound-waves from the disk which I substitute for the diaphragm and the final disposition of such sound-waves in such way that they will not interfere with the flow of the succeeding sound-waves. To accomplish this result I discard the ordinary diaphragm employed with acoustic telephones and in its place employ a disk having radial subdivisional extensions at its periphery, and I support the disk by means of a series of radial spokes extending out from a hub or frame, so that as the sound-waves flow from the center of the disk to the periphery thereof they may pass in a continuous course from the disk to the spokes and may be subsequently carried to the point at which they are decomposed, so as not to interfere with the flow of the succeeding sound-waves. I also prefer to employ in connection with the disk so supported a secondary disk supporting the first disk, which is thus supported on a series of radial spokes or arms and which rests upon a rubber-incased air-chamber, to which the sound-waves pass and by which they are decomposed, so as not to interfere with the flow of the succeeding sound-waves, the latter construction having special advantages in connection with the resonance-chamber, from which the receiving-tube extends, so that the sound is imparted to the air within such chamber from the different disks supported thereon and which have free opportunity to vibrate, so as to impart the sound-waves to the air within such resonance-chamber and also impart structural elasticity to the telephone. I have also improved the construction of the telephone in other particulars relating to the proper support thereof, the connection for the magneto bell or annunciator, and the support of the wire leading from one telephone to the other.

To enable others skilled in the art to make and use my invention, I will describe the same more fully, referring to the acompanying drawings, in which—

Figure 2:
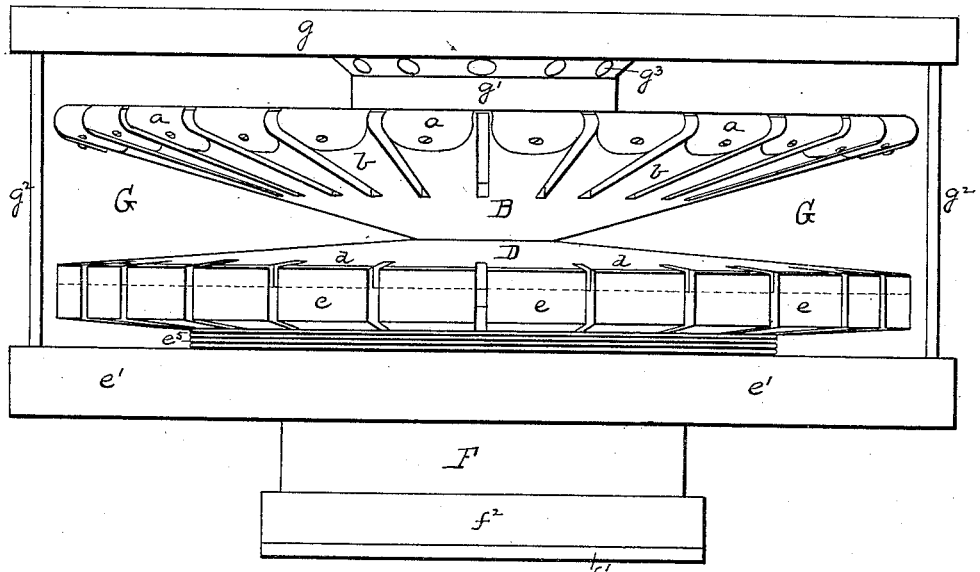
Figure 7:
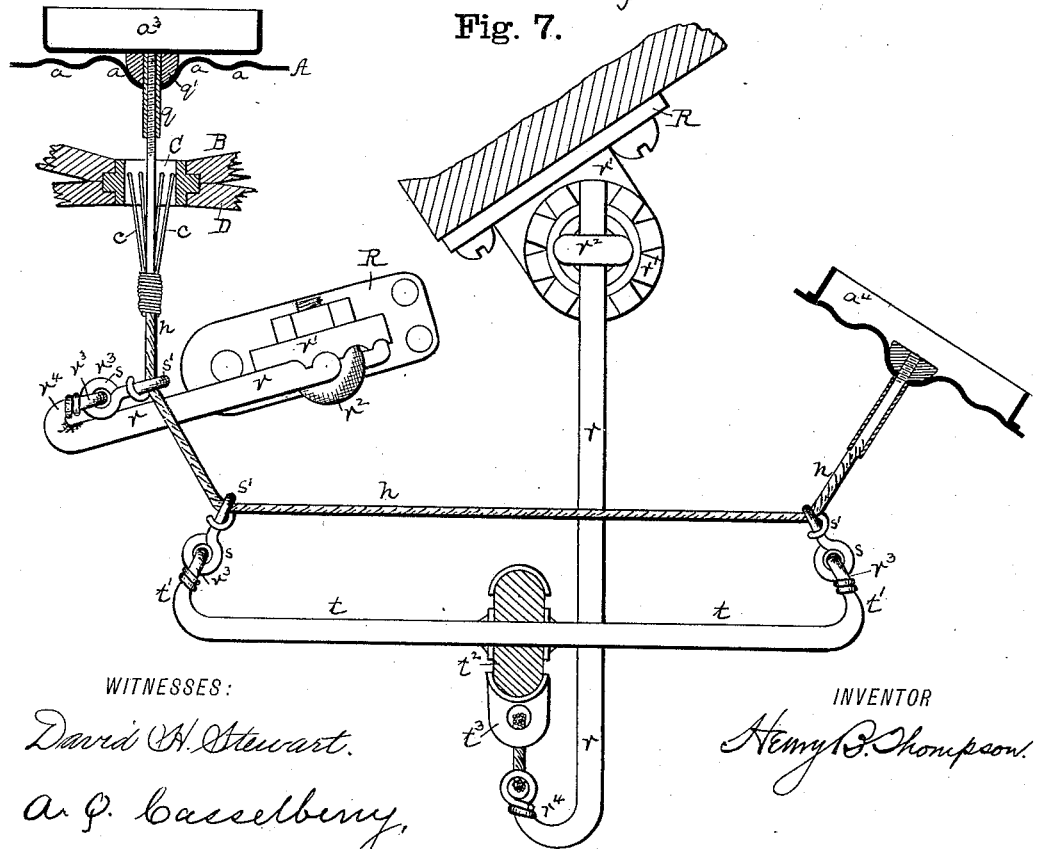

Figure 1 is a sectional view of the telephone and its connections, showing the case for the magneto-bell, inside view. Fig. 2 is a side view, partly broken away, of the telephone transmitter and receiver to illustrate the arrangement of the different parts. Fig. 3 is a face view of the telephone transmitter and receiver broken away on different lines to show the several parts of the telephone and illustrate its construction. Fig. 4 is a rear view of the support for the primary disk, showing the method of connecting the disk to such support. Figs. 5 and 6 are detail views illustrating the construction of the parts for supporting the telephone, and Fig. 7 is a view of the method of connecting and supporting the wire or cable leading from the disk and illustrating the manner of supporting the same at angles.

Like letters of reference indicate like parts in each.

I will first describe the construction of the telephone proper and then the construction of the supporting parts.

The disk A is preferably made of metal, and for the purpose I prefer to employ sheet-aluminum, as I find that it possesses the proper resonance for the purpose. Around the outer edge of the disk A it is divided into a series of subdivisions or extensions $a$, which extensions are connected to a supporting-frame B, which fits around the hub C, through which the line wire or cable passes, the circular frame B having a series of arms or spokes $b$, to which the radial extensions $a$ of the primary disk are connected, it being preferred that such radial extensions $a$ shall fit over the edge of the spokes $b$ and be secured thereto by screws or in any other suitable way.

For the purpose of a transmitting-telephone the frame B may rest upon the decomposing chamber or casing directly, so that the sound-waves may pass over the surface of the disk $a$ and thence to the radial extensions thereof and to the radial spokes of the circular frame B, and then be decomposed by the rubber-incased air-chamber. I prefer, however, especially for the purpose of receiving, to employ a secondary disk and a supporting-frame therefor to obtain the necessary structural elasticity and vibration within the resonance-chamber. For this purpose, back of the primary supporting-frame B, I place the secondary disk D, which is circular in form and has formed around its outer edge the radial extensions or subdivisions $d$, this secondary disk extending to and being supported by a series of radial spokes $e$ of the secondary frame E, to which the radial extensions are connected, this secondary frame E resting upon the rubber-incased air-chamber F, the sound-waves imparted to the primary disk traveling first outwardly along its surface, then inwardly along the primary supporting-frame to the central hub C, and then outwardly along the secondary disk D and inwardly along the secondary frame E to the rubber-incased air-chamber, at which said sound-waves are decomposed. The sound-waves being thus carried away from the primary disk, which is set in vibration by the voice or by the line-wire, and being carried in such course, they will not interfere with the succeeding sound-waves, and are finally decomposed at the chamber F. By such construction it will be seen that I obtain the combination of a flat disk A, a concave disk B, and a convex disk D, connected together alternately at their centers and circumferences and so acting to form a compound disk-spring, giving structural elasticity to the entire instrument to or from which vibration is imparted or received.

In order to assist the secondary frame in supporting the strain on it, which is necessarily heavy when the instrument is in operative position, I wind back of the secondary frame E and between it and the back wall $e'$ of the inclosing case the wire strands $e^5$, which greatly increase the strength of these parts and prevent their fracture under the strain.

The secondary supporting-frame E has back of its radial spokes or arms $e$ the circular body portion $e'$, forming the back of the resonance-chamber, that chamber being formed by the front inclosing cover $g$, having the mouth-piece $g'$, and by the tubular body portion $g^2$, extending between the back $e'$ and the cover $g$, and so forming the resonance-chamber G, inclosing the several disks and their supporting-frames, which are set in vibration in the manner above stated. By such construction where the telephone acts as a receiver it will be noticed that the vibrations imparted from the line-wire act first upon the primary disk and then upon the supporting-frame therefor, then upon the secondary disk and the supporting-spokes $e$ of the secondary frame, all of which are thrown in vibration and act to generate the sound-waves within the resonance-chamber G, whence they are carried to the ear.

To assist in the generation of the vibrations within the resonance-chamber, I prefer to form the central part of the primary disk A with a series of annular corrugations $a^2$, corresponding to the ordinary sound-waves imparted from the line-wire terminal, such corrugations being curved in shape, as shown, so that they receive the sound-waves on lines corresponding to their ordinary flow, and there is no angular resistance to the wave-line shape introduced at the center of the primary vibrating disk. I would also carry from the main or line wire auxiliary connecting-wires $c$, which are secured to the hub C and between the primary supporting-frame B and the secondary disk D, so that the vibrations from the line-wire may be also imparted at the base of the primary supporting-frame and center of the secondary disk. I generally prefer for the purpose of proper support to provide the spokes $e$ of the secondary frame E with forwardly-extending lips $e^2$, within which the ends of the spokes or extensions $d$ of the secondary disk fit, such construction not interfering with the flow of the sound-waves, while at the same time it enables me to more properly support the secondary disk, and through it the primary disk and its supporting-frame.

As there is liability of varying strain upon the line-wire, and consequently a variation in the distance of the disk from the cover $g$ and a variation in the manner in which the sound-waves strike the disk, I employ a telescopic transmitting-cup $a^3$ or ring $a^4$, rigidly connected to the disk and fitting within the mouth-piece $g'$, which cup will move with the disk, according to the strain thereon, moving within the mouth-piece. This cup will also act to concentrate the sound upon the central portion of the disk and enable it to move perfectly to take up the sound-wave. If the mouth-piece is employed for hearing, I may form around it a series of holes $g^3$, extending into the resonance-chamber G, through which the sound-waves may pass to the ear, the employing of the cup $a^3$ therefore not interfering with the reproduction.

In order to support the rubber-incased air-chamber and the parts of the telephone thereon, I employ the following construction, which I will describe, to form the supporting-bracket to be secured to the wall: I first secure to the wall a plate $i$, having a dovetailed edge, by means of the bolt $i'$, and fitting around said plate are the two clamping-pieces $i^2$, at the outer end of which is a socket $i^3$, within which is clamped the ball $j$, said ball being clamped in any desired position by the tightening of the screws $i^4$, by which the clamping-pieces are held together. Extending out from the ball $j$ through an opening in the socket $i^3$ is the arm $j'$, which carries at its upper end a tubular base-piece K, in one end of which the tube K', which might be termed the "wall-pipe," fits, this wall-pipe extending through the wall and the line-wire $h$ passing through the same, the tube being held in place by the set-screw $l'$ of the magneto supporting-bracket L, passing through the sleeve $l$ of said bracket, which fits around the tubular base-piece K, so securing the base-piece. A like sleeve $l^2$ of the frame L fits around the other end of the tubular base-piece K and is secured by another set-screw $l^3$. On each side of the tubular base-piece K the frame L is arranged with curved slots $l^4$, which engage with studs extending out from the sleeves $l^2$ and are adjusted on said studs by suitable set-screws, so that the upper part of the frame L can be arranged at any desired incline with relation to the base-piece K, according to the incline of the telephone-body, so that the box M of the magneto-bell may be held in a vertical position, no matter what the position of the telephone proper may be, the frame L having the vertical bars $m$ extending up therefrom, which are secured to the box M by suitable clamps $m'$. Sliding longitudinally within the tubular base-piece K is the tube $k$, which is held in line with the tubular base-piece by a groove-and-feather connection, and said tube $k$ is threaded at the forward end to receive the base-piece $f$ of the air-chamber F, said base-piece being screwed onto the tube and having an annular flange $f'$ extending out from it, around which the outer edge of the rubber cup F' of the chamber is clamped by the band $f^2$. The rubber cup F' extends down to and fits around the threaded end of the tube $k$ and is clamped thereon by a nut $k'$. I also prefer to clamp between said nut and the rubber cap a rubber washer $n$, which has a series of radial arms secured to the secondary frame E, and which serve to support the secondary frame and the telephone when the telephone is switched off in the manner hereinafter described.

Any suitable construction of rubber-incased air-chamber may be employed, the essential point being that the air within the rubber body shall act to decompose and prevent the transmission of the vibrations whether arising from the sound-waves or from foreign vibrations passing to it from the structure on which the instrument is supported. The forward end of the tubular base-piece K is formed on an incline, as shown in dotted lines in Fig. 1 and in full lines at $k^2$ in Fig. 5, and fitting around the tube $k$ is a switch $p$, which is formed of a tubular sleeve entering within the base-piece $f$ of the chamber F and around the tube $k$ and fitting against a shoulder in said base-piece $f$ and having a like incline or cam-face bearing the cam-face $k^2$ of the tubular base K, said sleeve $p$ having an arm $p^2$, by which it can be turned upon the tube $k$ and force the tube $k$ back and forth within the tubular base K, such cam-piece being employed to stretch the line-wire $h$ in the tube $k$ and bring it into position for telephoning, or, when the switch is turned in the opposite direction, to remove the operative parts of the telephone from the strain of the line-wire.

In order to hold the line-wire when the telephone is not in operative position, I secure to the forward set-screw $l^3$ of the frame L the insulated cord or wire $h^2$, which is also secured to the line-wire $h$ and serves to hold the same in proper position when the switch is so turned as to slacken the line-wire from the point $h'$ at which such cord $h^2$ is connected by the line-wire to the body of the telephone. Such cord $h^2$ extends through an opening $h^3$, formed in the tubular base K, such opening giving free opportunity for the movement of the stay-cord $h^2$. Any suitable connection from the magneto-bell to the line-wire can of course be made, that shown being the wire $m^2$, extending to the line-wire $h$ through the opening $h^3$. I prefer to employ a suitable wire cable as the line-wire, though a suitable single wire strand may of course be employed. The line-wire $h$ is secured to the disk A in any suitable way, that preferred being a tube $q$, screwing upon the wire and suitably secured thereto and having a nut $q'$ secured to the transmitting-cup $a^3$ and fitting in a depression in the primary disk. For supporting the line-wire in its course any suitable non-elastic form of hanger may of course be employed; but I prefer to employ that shown in the drawings, in which a wall-plate R has formed thereon a radially-curved bracket $r'$, having a central opening through the same, to which an eyebolt $r^2$ passes to clamp the supporting-arm $r$ at the inner end thereof, such an arm having an insulated loop at the upper end to engage with the line-wire, while the supporting-arm may be arranged at any angle and extend at any desired distance from the bracket, and by such construction, while the line-wire is held firmly in place, the outer or free end of the supporting-arm $r$ may swing longitudinally with the wire and permit the free longitudinal movement thereof, so as to impede in no way the transmission of the vibration. The point of fixed support is thus placed on the inside of the circle or angles in the line-wire and not on the outside, as heretofore commonly practiced. The upper end of the supporting-frame $r$ is bent backwardly, as at $r^4$, and is preferably formed tapering and has an insulated loop $r^3$, so as to prevent any trans-elastic spring action and to permit the free longitudinal movement of the wire. In the insulated loop $r^3$ fits an insulated loop or ring $s$, which carries a suitable snap-hook or wire $s'$, fitting around the line-wire. The point of contact of the ring $s$ with the loop $r^3$ is covered with insulating material, so as to prevent the escape of the electric current in operating the magneto-bell or of molecular vibrations in operating the telephone. Such a form of bracket serves well in turning slight angles; but for turning right angles or other abrupt angles I prefer to employ in addition thereto a non-elastic hanger-arm $t$, which is secured to the bent arm $r^4$ of the supporting-arm $r$, the hanger-arm $t$ being tapered and bent down at each end, as at $t'$, and having a like insulated loop $r^3$ to engage with the insulated ring $s$, connected to a wire which passes through such loop, supported at each end of the hanger-arm $t$, so that the hanger is divided. The hanger-arm $t$ is connected at the center to the supporting-arm $r$ by means of a fixed rubber insulator $t^2$, connected by the link $t^3$ to the arm $r^2$ of the supporting-arm $r$, such rubber insulator forming a pivotal point for the hanger-arm $t$ to swing or move at its center, so as to conform to the movements of the wire, while the rings $s$ at the ends of said hanger $r$, in combination with all parts between said ring and wall-plate R, permit the free longitudinal movement of the line-wire.

In employing the telephone the usual course is, after arranging the direction in which the telephone-line enters the apartment where the instrument is to be located, so as to avoid all angles possible, to secure the dovetailed plate $i$ and bolt $i'$ to the wall, and, by means of the clamp $i^2$, to secure the base-plate K in the desired position. The operator can then bore through this plate into the wall, the tubular base acting as a guide, and can insert the wall-pipe K' and secure the bracket L to the wall-pipe by means of the set-screws $l'$ $l^3$. At the same time the tube $k$ is inserted in the tubular base K, said tube carrying the telephone proper, and when the feather for said tube is secured in place and the line-wire connections are made to the primary disk and to the secondary disk and the stay-wires $h'$ and the magneto-bell has been adjusted in position the telephone is ready for operation.

In operating the telephone the sound-waves from the voice strike against the primary disk A into cup $g^2$ and set the disk in vibration, the vibrations passing out upon the line-wire and also passing outwardly over the primary disk, and, when reaching the periphery thereof, instead of returning over the same disk, as occurs where the outer edge of the periphery is firmly held, the said vibrations pass onto the spokes or radial arms of the primary supporting-frame B and pass down same to the hub C, and thence out the secondary disk D and through its radial arms $d$ to the spokes $e$ of the secondary supporting-frame E, which rests upon the rubber-incased air-chamber F, being pressed against the same by the tension of the line-wire, at which point the vibrations are decomposed and lost. By such construction, therefore, simply the primary vibrations, free from any interfering vibrations caused from collisions of vibrations in the primary disk, pass outwardly over the line-wire and to the receiving-telephone. When such vibrations reach the receiving-telephone, they enter the same through both the primary disk A and the secondary disk D, in the latter case through the auxiliary wires $c$, and they set in vibration within the resonance-chamber G both the primary disk A and its supporting-frame and the secondary disk D and the spokes of its supporting-frame, the vibrations passing thence in the source above described to the rubber-incased air-chamber, so that they are decomposed or lost, and the several vibrations imparted to the disk succeeding each other and following each other in the manner described until they are decomposed at such air-chamber, while the air within the resonance-chamber D is set in vibration by such disks, sound-waves corresponding to those generated at the receiving-telephone being so generated within the resonance-chamber and passing through the receiving-tube or out through the receiving-perforations in the mouth-piece, and all fear of the formation of humming sounds, metallic echoes, and other interfering noises being prevented, as, though its several supporting-frames are set in vibration and act on the air in the resonance-chamber, there is no danger of the vibrations colliding with each other, so that a clear and perfect reproduction is obtained. When the telephones are not in use, the operator simply draws around the switch-handle $p^2$, relieving the telephone-body from the strain of the line-wire, which is then taken by the stay wire or cord $h^2$. When a call is to be made, on the operation of the magneto-bell a current will pass through the wire $m^2$ to this point of connection of the line-wire and give the alarm, and the operator then, by means of the handle $p^2$, turns the switch $p$ so as to bring the telephone into operative position, stretching the line-wire by forcing forward the tube $k$, which supports the telephone-body. As the vibrations pass out along the wire they have the freest opportunity for movement through the supporting-hangers, as such hangers are simply held at the center of the circle or arc in which they may swing. In swinging on such a radius they do not unduly stretch or interfere with the movement of the line-wire or cause trans-elastic strains, and the loop connections with the supporting-arms all permit of great freedom of longitudinal movement. I am thus enabled to obtain an acoustic or mechanical telephone in which the collision or interference of sound waves or vibrations upon the primary disk are entirely prevented, because such vibrations are carried directly away from the disk as soon as created and are prevented from colliding with the vibrations at any point in their course, and therefore the primary disk can quickly reach an equilibrium ready to receive the succeeding vibrations from the line-wire or created by the voice.

What I claim as my invention, and desire to secure by Letters Patent, is—

1. In an acoustic telephone, the combination of a primary disk having radial extensions formed at its periphery and a supporting-frame having radial spokes or arms to which such extensions of the primary disk are connected, substantially as and for the purposes set forth.

2. In an acoustic telephone, the combination of a primary disk having radial extensions at its periphery and a supporting-frame having radial spokes or arms to which the radial extensions of the disk are connected, said supporting-frame engaging with a hub through which the line-wire passes, substantially as and for the purposes set forth.

3. In an acoustic telephone, the combination of a disk having radial extensions at its periphery and a supporting-frame having radial spokes or arms, the radial extensions of the disk extending over and being secured to the backs of said spokes, substantially as and for the purposes set forth.

4. In an acoustic telephone, the combination of a flat disk, a concave disk, and a convex disk connected together alternately at their centers or circumferences to form a compound disk-spring, substantially as and for the purposes set forth.

5. In an acoustic telephone, the combination of a primary disk, a primary supporting-frame, a secondary disk back of and supporting the primary disk and its frame, and a secondary supporting-frame supporting the secondary disk, substantially as and for the purposes set forth.

6. In an acoustic telephone, the combination of a disk having radial extensions at the ends thereof, a supporting-frame having radial spokes with which such radial extensions engage, and a cushion supporting said frame and acting to decompose the vibrations imparted to the disk, substantially as and for the purposes set forth.

7. In an acoustic telephone, the combination of a primary disk, a primary supporting-frame, a secondary disk supporting the primary disk and its frame, a secondary frame supporting the secondary disk, and a cushion supporting the secondary frame, substantially as and for the purposes set forth.

8. In an acoustic telephone, the combination of a primary disk having radial extensions at the periphery thereof, a primary supporting-frame having spokes with which such radial extensions engage, a secondary disk having radial extensions at its periphery, and a secondary supporting-frame having radial spokes or arms engaging with the extensions of the secondary disk, substantially as and for the purposes set forth.

9. In an acoustic telephone, the combination of a line-wire, a primary disk which engages a primary supporting-frame engaging with a central hub through which the line-wire passes, a secondary disk back of the supporting-frame, and auxiliary wires engaging with the secondary disk, substantially as and for the purposes set forth.

10. In an acoustic telephone, the combination of a disk, a supporting-frame therefor, and a cushion formed of a rubber cup, and a metal base forming a rubber-incased air-chamber on which said supporting-frame rests, substantially as and for the purposes set forth.

11. In an acoustic telephone, the combination of a disk and frame supporting the same and resting upon a cushion, a tube extending through such cushion, and a stay-washer secured to said tube and to such supporting-frame, substantially as and for the purposes set forth.

12. In an acoustic telephone, the combination of a tubular base or holder through which the line-wire passes, and a cam-switch for moving the telephone-body and bringing it into operative position, and a stay-wire connected to a line-wire, and the tubular holder, substantially as and for the purposes set forth.

13. In an acoustic telephone, the combination of a tubular base or holder supporting the telephone-body and a bracket secured thereto and adjustable thereon, said bracket having vertical arms for supporting the case of the magneto-bell, substantially as and for the purposes set forth.

14. In an acoustic telephone, the combination of a tubular holder supporting the telephone-body, said holder having a ball on the arm thereof, and a clamp having a socket in which such ball fits and engaging with a bolt secured to the wall, substantially as and for the purposes set forth.

15. In an acoustic telephone, the combination of a tubular holder supporting the telephone-body, said holder having a ball on the arm thereof, and a clamp having a socket in which such ball fits and engaging with a bolt secured to the wall, said bolt carrying a dovetailed plate around which the clamp fits, substantially as and for the purposes set forth.

16. A hanger for an acoustic telephone, having a radial bracket, in combination with an eyebolt and a supporting-frame fitting on said radial bracket and held in place by the eyebolt, substantially as and for the purposes set forth.

17. In a support for the line-wire of an acoustic telephone, the combination of a supporting-arm held at one end and having a U-shaped upper or free end, and a hanger-arm connected to the supporting-arm at its center and engaging with a line-wire at its ends, substantially as and for the purposes set forth.

18. In an acoustic telephone, the combination of a rigid support, a telephone-body, and a rubber-incased air-chamber supporting the telephone-body and connecting it to the rigid support, substantially as and for the purposes set forth.

19. In an acoustic telephone, the combination of a disk, a line-wire secured thereto, a concentrating cup or ring secured to the outer face of the disk, and a mouth-piece with which the cup telescopes, substantially as and for the purposes set forth.

20. In an acoustic telephone, the combination of the supporting-frame E, the inclosing case having the back wall $e'$ connected to the supporting-frame, and the supporting wire strands $e^5$ between the frame and back wall, substantially as and for the purposes set forth.

In testimony whereof I, the said HENRY B. THOMPSON, have hereunto set my hand.

HENRY B. THOMPSON.

Witnesses:
JAMES I. KAY,
ROBT. D. TOTTEN.